United States Patent [19]
Kosinski

[11] 4,318,460
[45] Mar. 9, 1982

[54] PRESSURIZED FLUID CHAMBER WITH SUPPLY AND BLEED FITTING

[75] Inventor: Alfred E. Kosinski, South Bend, Ind.

[73] Assignee: The Bendix Corporation, Southfield, Mich.

[21] Appl. No.: 98,470

[22] Filed: Nov. 29, 1979

[51] Int. Cl.³ ............................................. B60T 11/30
[52] U.S. Cl. ..................................... 188/352; 60/584
[58] Field of Search ................... 60/584; 137/614.17, 137/614.18; 188/352

[56] References Cited

U.S. PATENT DOCUMENTS

| | | | |
|---|---|---|---|
| 2,146,545 | 2/1939 | Leighton | 188/352 X |
| 3,570,634 | 3/1971 | Yamamoto | 188/352 |
| 3,809,359 | 5/1974 | Truelove | 188/352 X |

Primary Examiner—Duane A. Reger
Attorney, Agent, or Firm—Paul David Schoenle; Ken C. Decker

[57] ABSTRACT

A fluid-operated brake embodying a pressurized fluid chamber with a single supply and bleed fitting is provided. The pressurized fluid chamber can be a wheel cylinder of a drum brake or a caliper housing of a disc brake, by way of example. The chamber has a single port therein in which a fitting is mounted, the fitting being designed to supply fluid under pressure to the chamber and to bleed gas, commonly air, from the chamber. With only a single opening for the chamber, one boss can be eliminated to save weight, and machining of that boss is also eliminated to save costs. The single opening also achieves greater flexibility in design options.

8 Claims, 3 Drawing Figures

PRESSURIZED FLUID CHAMBER WITH SUPPLY AND BLEED FITTING

This invention relates to a fluid-operated brake having a pressurized fluid chamber with a single opening in which is mounted a combination supply and bleed fitting.

Hydraulic or fluid-operated brakes with pressurized fluid chambers include drum brakes having wheel cylinders and disc brakes having caliper housings, by way of example. Heretofore, such chambers have been equipped with two ports or openings therein, one through which fluid under pressure is supplied to the chamber and one through which air is bled from the chamber. The ports have been machined through bosses in the chamber wall. The bosses add weight to the brake and both ports require machining to provide threads therein and machined surfaces therearound. The two bosses also can limit design options for a particular brake.

The present invention provides a fluid-operated brake with a pressurized fluid chamber having but a single port or opening therein through which the fluid is supplied and from which gas can be bled. The single port eliminates one boss, thereby saving weight. The single port also reduces machining time and, therefore, costs. Further, the single port enables the particular brake incorporating the pressurized fluid chamber to have greater design options or flexibility.

It is, therefore, a principal object of the invention to provide a fluid-operated brake having a pressurized fluid chamber with only a single port or opening therein.

Another object of the invention is to provide a fluidoperated brake with a pressurized fluid chamber which is lighter in weight.

A further object of the invention is to provide a fluid-operated brake with a pressurized fluid chamber which is lower in cost.

Still another object of the invention is to provide a fluid-operated brake which has greater flexibility as to design options.

Many other objects and advantages of the invention will be apparent from the following detailed description of a preferred embodiment thereof, reference being made to the accompanying drawings, in which.

Figure 1:
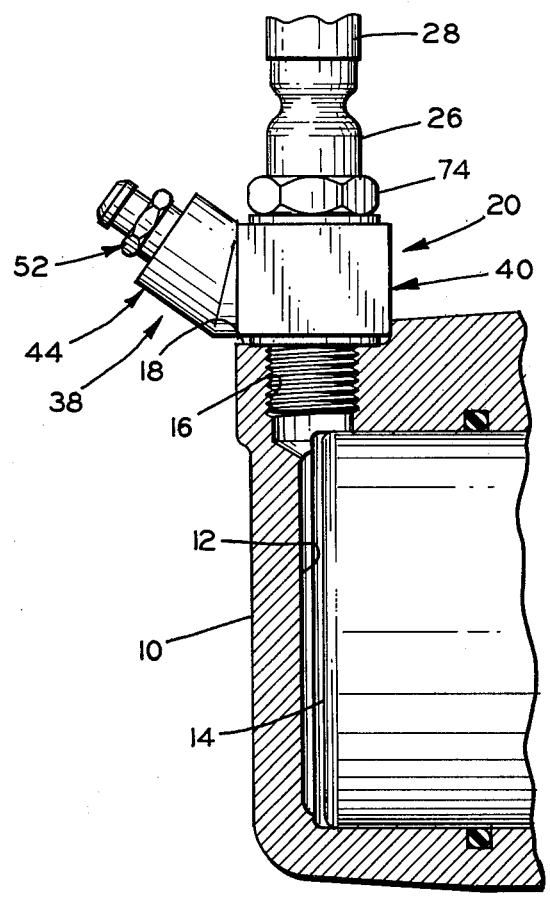
FIG. 1 is a fragmentary view in cross section of a pressurized fluid chamber for a fluid-operated brake with a single port or opening and supply and bleed fitting mounted therein.
Figures 2, 3:
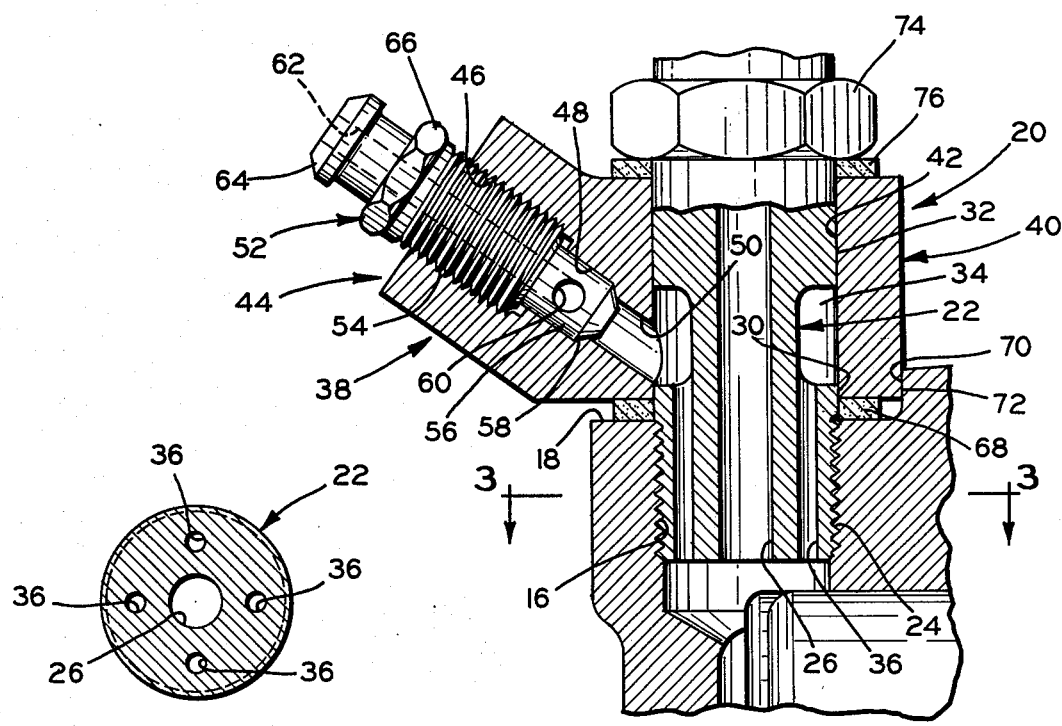
FIG. 2 is an enlarged view in vertical cross section taken through a portion of the chamber wall and the fitting of FIG. 1.
FIG. 3 is a view in cross section taken along the line 3—3 of FIG. 2.

Referring particularly to FIG. 1, a housing 10 forms a pressurized fluid chamber 12 containing a piston 14. The chamber 12 can be a wheel cylinder of a drum brake or a caliper housing for a disc brake, by way of example. If a disc brake is employed, the caliper can be of the type shown in U.S. Pat. No. 3,958,668, by way of further illustration. The housing 10 has a single threaded port or opening 16 therein communicating with the chamber 12 and with an outer machined surface 18.

A single supply and bleed fitting 20 is mounted in the opening 16 and serves to supply fluid under pressure to the chamber 12 and to bleed gas from the chamber. The fitting 20 includes a central member or core 22 having a threaded end 24 received in the opening 16 with a central supply passage 26 extending from the threaded end of the core 22 to a connector 28 for connecting the fitting 20 to a brake fluid supply line 28. The core 22 also has cylindrical surfaces 30 and 32 between which is an annular groove 34. Four bleed lines 36 extend from the threaded end of the core to the annular groove 34.

A bleed housing or member 38 has a generally cylindrical portion 40 with a cylindrical inner surface 42 extending around the cylindrical surfaces 30 and 32 of the core 22. This enables the bleed housing 38 to rotate or pivot relative to the core 22 so as to be placed in a variety of positions relative thereto. The bleed housing also has an annularly-extending valve portion 44 projecting outwardly from the cylindrical portion 40. The portion 40 has a threaded recess 46, a valve seat or shoulder 48, and a valve passage 50 communicating with the annular groove 34.

A valve body 52 is mounted in the nipple 44 and includes a threaded portion 54 received in the threaded recess 46 with a valve extension 56 extending therefrom and forming a valve surface 58 cooperating with the valve seat 48. The extension 56 has a transverse bore or passage 60 therein communicating with a central, longitudinal passage 62 extending through the body 52 to a hose nipple 64 to which a hose can be attached when bleeding the pressurized fluid chamber 12. The valve body 52 also has a noncircular portion 66 to receive a wrench or other suitable tool for turning the valve body 52 to open and close the valve. When the valve body 52 is turned to move the valve surface 58 away from the valve seat 48, the gas in the chamber can be vented through the passages 36 to the annular groove 34 and, hence, through the valve passage 50, the transverse bore 60 and the central passage 62 in the valve body 52. When the gas has been bled and fluid begins to emerge from the hose nipple 64, the valve body 52 is turned in the opposite direction again to seat the valve surface 58 against the valve seat 48.

In mounting the fitting 20 in the opening 16, the portion 40 of the bleed housing 38 is positioned on the machined surface 18 with a sealing ring 68 therebetween and with a shoulder 70 on the portion 40 being in abutment with a shoulder 72 on the housing 10. The abutment between the shoulders provides a locking mechanism to affix the orientation of the bleed housing 38 relative to the caliper housing 10. The core 22 is then inserted into the bore defined by the cylindrical surface 42 and with the end 24 then threadedly engaged in the opening 16, with the aid of a connecting nut 74 which is integral with an upper portion of the core 22. An upper sealing ring 76 is located between the nut 74 and the portion 40 and, when the nut is tightened, the sealing rings 68 and 76 seal the bleed housing 38 relative to the core 22 and the caliper housing 10. Moreover, the nut cooperates with the housing shoulder 72 to fix the bleed housing in its desired angular orientation relative to the housing.

From the above, it will be seen that only the single port or opening 16 is required for the pressurized fluid chamber 12 to supply fluid thereto and to bleed gas therefrom. Hence, one of the thicker bosses as is usually required at the ports, is eliminated to save weight. The threads and machined surface for one port are also eliminated to reduce machining time and cost. In addition, the single port enables greater flexibility in the design option for the brake. With the bleed housing having variable orientation relative to the caliper housing, the fittings can be disposed at different angular positions for adaptation to a variety of brakes, as long as the bleed valve can be located at an angle of no more than 15° from the vertical.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In combination, means forming a pressurized fluid chamber for a fluid-operated brake, said chamber-forming means having a single opening therein through which fluid is supplied to the chamber and from which gas can be bled, and a fitting mounted in said opening and extending outwardly therefrom, said fitting having means for bleeding gas from said chamber and means for supplying fluid under pressure to said chamber, characterized by said bleed means comprising a valve seat formed by said fitting and a valve body for opening and closing said valve seat.

2. In combination, means forming a pressurized fluid chamber for a fluid-operated brake, said chamber-forming means having a single opening therein through which fluid is supplied to the chamber and from which gas can be bled, and a fitting mounted in said opening and extending outwardly therefrom, said fitting having means for bleeding gas from said chamber and means for supplying fluid under pressure to said chamber, characterized by said fitting comprising a core threaded in said opening with said fluid supply means comprising a passage extending through said core, and said bleed means comprising a bleed housing mounted around said core and having openable and closeable valve means.

3. The combination according to claim 2 characterized by said valve housing means being rotatably mounted on said core so as to be pivoted to a variety of positions around said core.

4. A fitting for a fluid-operated brake having means forming a pressurized fluid chamber with a single opening therein to which fluid can be supplied to the chamber and from which gas can be bled, said fitting having means for being mounted in said opening and extending outwardly therefrom, said fitting having passage means extending therethrough for communication at one end with the chamber and for communication at the other end with a fluid supply line, said fitting having means forming a valve seat, additional passage means communicating with said valve seat and for communication with said chamber, and a valve body carried by said fitting and having a valve surface for movement toward and away from said valve seat.

5. A fitting according to claim 4 characterized by said fitting having a core in which said passage means and said additional passage means are formed and having a valve housing in which said valve seat is formed mounted on said core, said valve body being carried by said valve housing.

6. A fitting according to claim 5 characterized by said core having an annular groove therearound with said valve seat communicating with said annular groove and said additional passage means communicating with said annular groove.

7. A fitting according to claim 5 wherein said valve housing is rotatably mounted on said core.

8. A fitting according to claim 7 characterized by said valve housing having sealing means at ends thereof around said core, and means on said fitting for compressing said sealing rings.

* * * * *